United States Patent [19]
Wright et al.

[11] Patent Number: 6,021,980
[45] Date of Patent: Feb. 8, 2000

[54] STABILIZATION OF RADIO CONTROLLED AIRCRAFT

[76] Inventors: Elliot Wright, The Couch House, Leggats Park, Potters Bar, EN16 1Nz, United Kingdom; Igor E. Tsibizov, Dept. of Aircraft Modelling, Moscow Aviation Institute, Volokolamskoye shosse 4, Moscow 125871, Russian Federation

[21] Appl. No.: 08/732,326

[22] PCT Filed: May 1, 1995

[86] PCT No.: PCT/GB95/00990

§ 371 Date: Oct. 28, 1996

§ 102(e) Date: Oct. 28, 1996

[87] PCT Pub. No.: WO95/30180

PCT Pub. Date: Nov. 9, 1995

[30] Foreign Application Priority Data

Apr. 29, 1994 [GB] United Kingdom ................... 9408586
Aug. 24, 1994 [RU] Russian Federation ............. 94030789

[51] Int. Cl.[7] .................................................. B64C 13/20
[52] U.S. Cl. ......................... 244/190; 244/189; 244/196; 244/194; 244/195; 356/139.03
[58] Field of Search ..................... 244/189, 190, 244/196, 197, 194, 195, 178, 177; 356/139.03; 250/202

[56] References Cited

U.S. PATENT DOCUMENTS

| 2,393,892 | 1/1946 | De Ganahl ............................... 244/189 |
| 2,769,601 | 11/1956 | Hagopian et al. ....................... 244/190 |
| 2,979,289 | 4/1961 | Abzug ..................................... 244/197 |
| 3,658,427 | 4/1972 | DeCou . |
| 4,109,886 | 8/1978 | Tribken et al. .......................... 244/178 |
| 4,236,685 | 12/1980 | Kissel ..................................... 244/195 |
| 5,507,455 | 4/1996 | Yang ...................................... 244/195 |

FOREIGN PATENT DOCUMENTS

| 2080520 | 2/1982 | United Kingdom .............. 356/139.03 |
| 49404 | 4/1994 | WIPO ................................... 244/190 |

*Primary Examiner*—Charles T. Jordan
*Assistant Examiner*—Tien Dinh

[57] ABSTRACT

A stabilization system is disclosed in which stabilization pitch and roll signals effective for stabilizing the aircraft are combined with respective pilot provided elevator and aileron position demand signals in accordance with a function which reduces the effects of the stabilizing signals in dependence on increasing values of the respective elevator and aileron position demand signals.

9 Claims, 2 Drawing Sheets

STABILIZATION OF RADIO CONTROLLED AIRCRAFT

This invention relates to stabilisation of the attitude of a radio controlled aircraft in pitch and roll.

Flying radio controlled model aircraft requires training and the acquisition of skill. Special easy to fly training aircraft are used for novices in order to reduce the risks of a crash. Especially during early training there is a risk that the novice pilot will create a situation which s/he has insufficient skill to recover from. Even training models will merely continue at the existing attitude if the controls are neutralised so positive action needs to be taken to recover. Radio failure, or interference will, or can, lead to a neutral setting of the controls so that the model just continues as it was before the interference. Even training models can be expensive to replace and a crash always carries an element of risk to personnel.

U.S. Pat. No. 2,828,930 describes a system for stabilising the attitude of an aircraft. If the system were applied to a radio controlled aircraft, however, the stabilisation system would continually resist attempts by the pilot to control the aircraft's attitude to perform manoeuvres.

Against this background, in accordance with the invention, there is provided a radio controlled aircraft, including a radio receiver for receiving an elevator position demand signal for specifying a required position for the elevator and at least one aileron position demand signal for specifying required positions for the or one of the ailerons; stabiliser means for generating pitch and roll stabilisation signals dependent on differences in the aircraft's attitude from level in pitch and roll respectively, mixer means for combining the stabilisation pitch and roll signals with the elevator and aileron position demand signals in a sense to stabilise the aircraft in accordance with a function which reduces the effect of the stabilisation signals in dependence on increasing values of elevator and aileron position demand signals respectively; and control means for controlling the positions of the elevator and ailerons in accordance with respective combined signals.

Importantly, if the pilot removes all input by neutralising the position of the stick, the stabilising signals will bring the aircraft into level flight. Small stick inputs will still be resisted by the stabilisation signals. However, large stick inputs will be less affected.

In one form, the values of the modified pitch and roll stabilisation signals are proportional to those of the (unmodified) pitch and roll stabilisation signals below respective thresholds and equal to zero above said thresholds.

More preferably, the values of the pitch and roll stabilisation signals are reduced in proportion to any increase in the respective elevator and aileron position demand signals from a maximum when the respective position demand signal is zero, to zero when the respective position demand signal has a predetermined value larger than zero, e.g. corresponding to maximum deflection of the elevator or ailerons.

Most preferably, the radio receiver is adapted for receiving a gain setting signal to which the means for modifying the pitch and roll stabilisation signals is responsive to provide a level of gain dependent on the gain setting signal.

In one convenient form, two pairs of directional light sensors are provided, the sensors of each pair being responsive to light input from two different directions on opposite sides of a respective axis to provide respective light level signals indicative of the level of light sensed said stabiliser means being responsive to difference between the light level difference signals to provide difference signals.

The signal from each sensor will vary in value dependent on whether it is directed above or below the horizon. When the aircraft is level and the two sensors are directed at the horizon, the difference should be zero.

The light sensors are preferably photo conductive light sensors connected in series across a reference voltage. The light sensors may be aligned approximately normal to respective pitch and roll axes.

In order to reduce the possibility of a sensor being incapacitated by a deposit of oil or other pollutant it would be preferable if none of the sensors faced directly in the direction of motion. In a preferred arrangement, the light sensors are aligned in directions approximately bisecting the angles between the pitch and roll axes.

In this arrangement, in order to derive suitable stabilisation signals there is preferably included means to add the differences in order to provide one of the pitch and roll stabilisation signals and to subtract one difference from the other in order to provide the other of the pitch and roll stabilisation signals.

One embodiment of the invention will now be described, by way of example, with reference to the accompanying drawings, in which.

Figure 1:
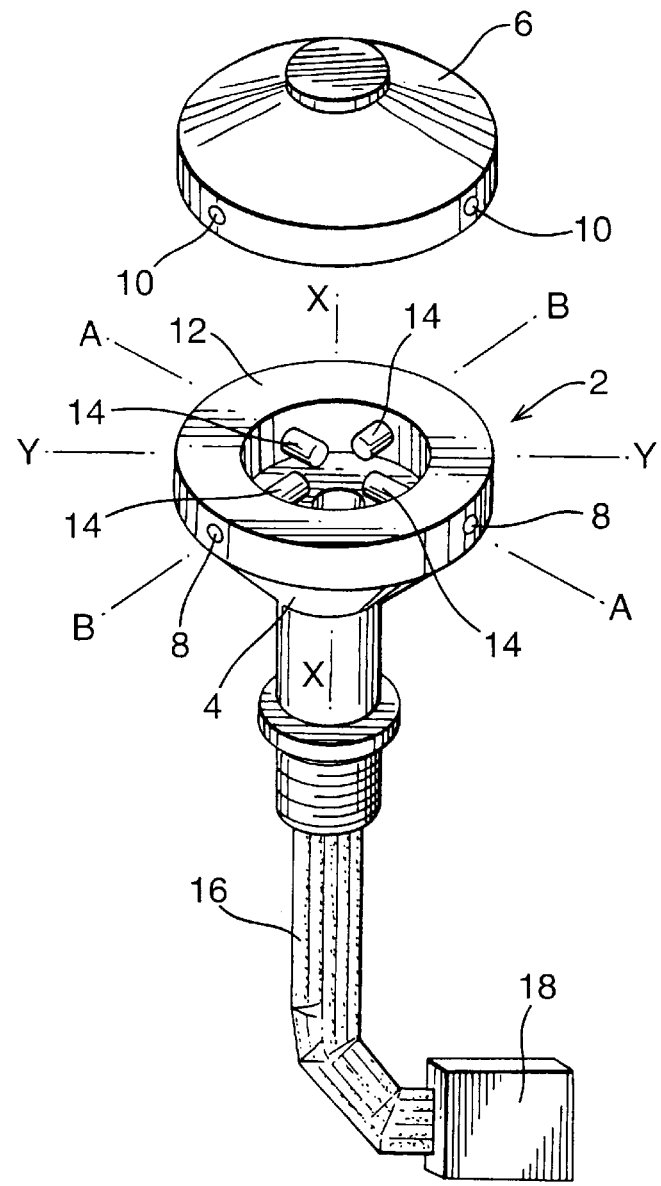
FIG. 1 is an exploded pictorial view of a sensor unit for apparatus embodying the invention for stabilising the attitude of a craft.
Figure 1A:
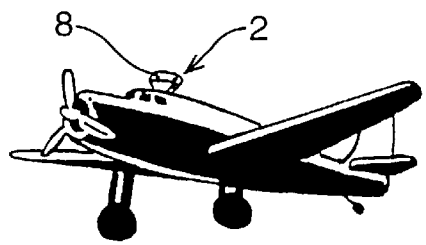
FIG. 1A is a pictorial view of the sensor unit of FIG. 1 installed on a model radio controlled aircraft.

Referring to the drawings, the apparatus is intended to stabilise the attitude of a model aircraft about two axes so as to control the pitch and the angle of bank of the aircraft. A sensor unit 2 shown in FIG. 1 is has the external semblance of a model radome. The unit has a body 4 and a cover 6. Four small holes 8 are provided in the periphery of the body aligned with corresponding holes 10 on the cover. Two of the holes 8,10 are aligned diametrically opposite on one axis A—A. The other two holes 8,10 are aligned diametrically opposite on an axis B—B normal to the axis A—A and generally in the same plane.

The body 4 has a central chamber 12 into which the holes 8 extend. A photoconductive light sensor (photo resistor) 14 is mounted in the inner end of each hole 8 so as to sense light entering from the outer end of the hole. In the particular example the holes are about three times as long as their diameter, more preferably 2 to 2½ times, so that each photo resistor responds to light from the general direction of the axis A—A or B—B. In an even more preferred example the outer end of the holes is not circular but wider in the horizontal plane than in the vertical plane. For example, the holes may be 4 mm diameter round at the sensors and 6 mm wide by 2.5 mm high at their outer ends. More light is thus collected from a wider arc of the horizon.

The photo resistors are more sensitive to the blue and ultra violet end of the spectrum than to the red and infra red, so that the background illumination level normally increases above the horizon and reduces below the horizon. This is to avoid hot ground masking, or counteracting, the increase of illumination level above the horizon. Either the photo resistors may be selected to be more sensitive to the blue/ultra violet end of the spectrum or, if light sensors are used which are undesirably sensitive to the red/infra red end of the spectrum, filters may be used to filter out the undesired part of the spectrum.

The sensor unit 2 is installed on the aircraft so that when it is in flying in a level attitude the axes A—A and B—B are directed at the horizon. If the aircraft's attitude is different from that, then one or both of the axes A—A and B—B will no longer be aligned with the horizon. Supposing the axis A—A is no longer aligned with the horizon, then one of the respective photo resistors will be directed above the horizon and will receive more light than the other which will be directed below the horizon.

Figure 2:
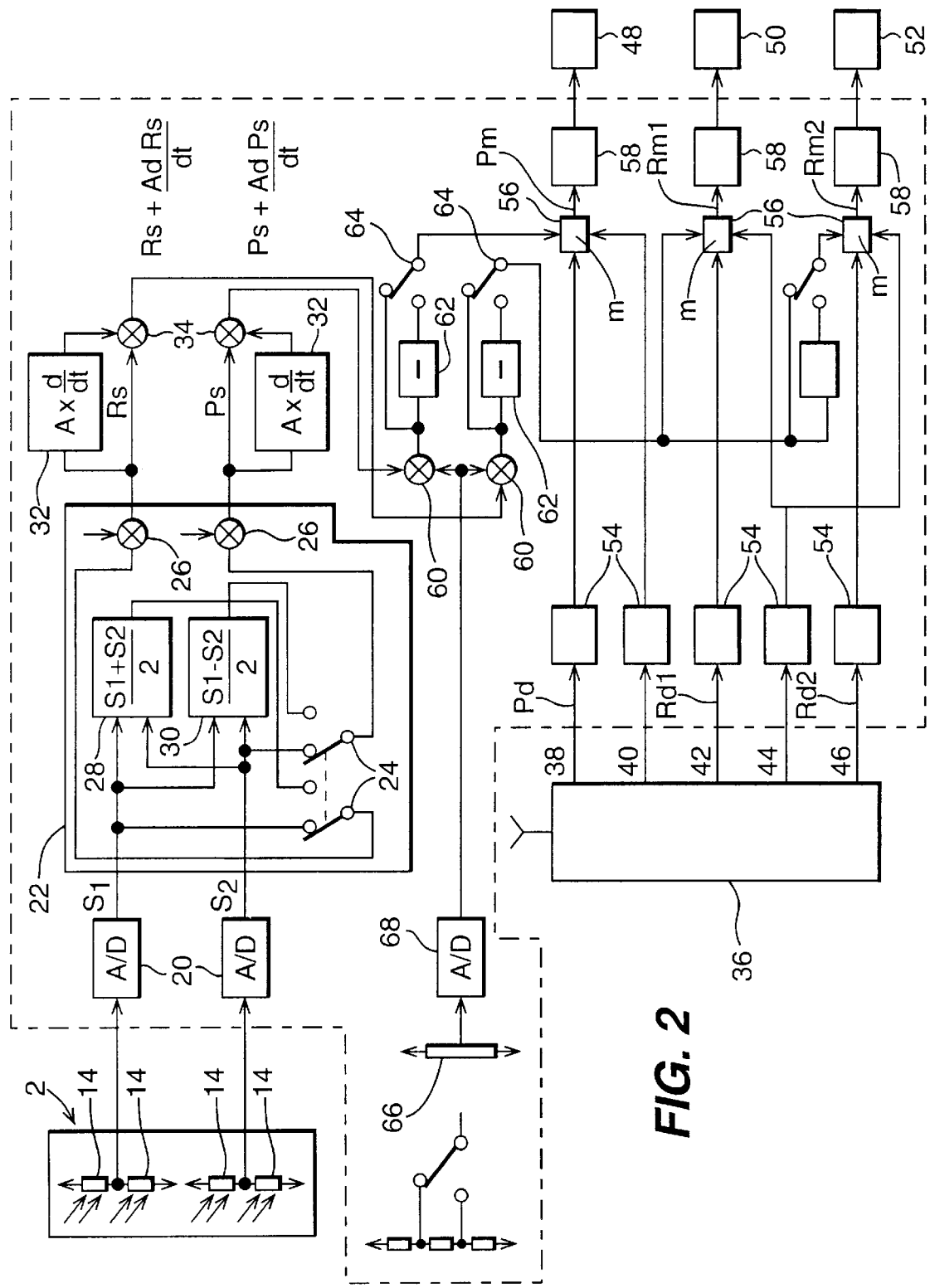
FIG. 2 is a block diagram of the apparatus.

A cable 16 and connector 18 (FIG. 1) connect the photo resistors as shown in FIG. 2. The two photo resistors 14 on one axis, e.g. A—A are connected in series across a voltage supply. The node between the photo resistors is connected to signal processing means 19 at an analog to digital convertor 20 in which an analog to digital conversion is performed. When the axis A—A is horizontal, the respective photo resistors 14 are directed at the horizon and receive nominally the same level of light so that the node between them is at a voltage level half way between the supply rails. If the axis A—A is inclined in one direction to the horizon, the upwardly directed photo resistor receives more light than the downwardly directed photo resistor. The resistance of the upwardly directed photo resistor falls and that of the downwardly directed photo resistor rises so that the voltage at the node between them rises.

The voltage at the node between the two photo resistors therefore rises and is converted into a digital light level difference signal S1, S2 by the analog to digital converter 20. The light level signal is transmitted to a signal shaping unit 22. With switches 24 set in the position shown, the light level signals S1 and S2 are each input directly with a digital reference to a subtractor 26. The digital reference signal is equivalent to equal light being received by the photo resistors. The output difference signal Rs represents angular deflection of the aircraft about the roll axis and the output difference signal Ps represents the angular deflection of the aircraft about the pitch axis.

The sensor unit 2 should be placed on the aircraft so that it is nominally horizontal in level flight. Provided the background light level is uniform in a plane parallel to the horizon, the digital reference signal could be set permanently. However, in reality, the background light level will not be uniform and the sensor unit 2 may not be completely accurately aligned. To accommodate these practical problems, the digital reference signals may be adjusted on the ground before flight and in flight via a respective radio channel.

If the axis A—A is inclined in the other direction to the horizon, the voltage at the node falls.

The direct comparison of the light level signals S1 and S2 with the reference signal is appropriate when the axes A—A and B—B are aligned with the pitch and roll axes of the aircraft. Especially in the form illustrated where the sensing unit has open holes 8 to direct the light sensors, it may be found that a forwardly directed hole is subject to blocking, e.g. with engine oil. In this case it would be an advantage if none of the holes is aligned in the direction of flight.

To this end the axes A—A and B—B may be aligned at 45° to the pitch and roll axes of the aircraft, i.e. in directions parallel to the bisectors of the angles between the pitch and roll axes. With this arrangement, the switches 24 are operated to their alternative positions so that the signals input to the subtractors 26 result from an adder 28 and a subtractor 30. The adder 28 produces a signal having a value one half of the sum of S1 and S2. The sum signal is input to the respective subtractor 26 to produce the signal R which represents the attitude of the aircraft about the roll axis. The subtractor 30 produces a signal which has a value one half the difference between S1 and S2. The difference signal is input to the respective subtractor 26 to produce the signal P which represents the attitude of the aircraft about the pitch axis.

The pitch and roll representative signals P and R, are dynamically shaped by respective differentiators 32 and adders 34 which add a differential component to produce proportional/differential stabilising signals $$Ps + A\frac{dPs}{dt} \text{ and } Rs + A\frac{dRs}{dt}$$

where A is gain.

The model is controlled by radio signals received by a receiver 36. The receiver decodes the received signals and places pulse width modulated signals on output lines 38 to 46, one for each channel. Position demand signals Pd on line 38, Rd1 on line 42 and Rd2 on line 46 are intended to control the position of respective servos 48, 50 and 52 which in turn control the aircraft's elevator (controlled by servo 48) and ailerons (controlled one each by servos 50 and 52) to control the attitude of the aircraft. Separate controls for each aileron allow their use also as flaps. Conventionally the output lines 38 and 42 and 46 would be connected direct to the respective servo. As shown in FIG. 2, however, the lines are connected to the controller 19 which converts the pulse width modulated signals to digital signals in convertors 54.

The stabilising signals $$Ps + A\frac{dPs}{dt} \text{ and } Rs + A\frac{dRs}{dt}$$

may be adjusted, as hereinafter described, by gain setting multipliers 60 and by invertors 62 under control of switches 64, and the adjusted signals are applied to the mixers 56.

Mixers 56 act, broadly, to modify the digital demand signals Pd, Rd1 and Rd2 increasing or reducing them in a sense to reduce the value of the respective stabilising signals $$Ps + A\frac{dPs}{dt} \text{ and } Rs + A\frac{dRs}{dt}$$

The modified demand signals Pm, Rm1 and Rm2 are converted to pulse width modulated signals by convertors 58 and drive the respective servos 48, 50 and 52.

In use, if the control sticks on the transmitter are neutralised, so that in the prior art arrangements the aircraft would continue doing what it had been doing, the modification to the pulses produced by the controller 19 will return the aircraft to a level attitude in both axes and the right way up. However, if the mixing function is mere summation, every demand input intended by the pilot will be resisted or counteracted by the stabilising signals.

To improve the response of the system to pilot inputs without reducing the effectiveness of the stabilisation system if the pilot looses control, the mixing function of the mixers 56 broadly reduces the effect of the stabilisation signals in dependence on increasing values of elevator and aileron position demand signals respectively.

Broadly, for each mixer:

$$U_{output} = U_{input1} + U_{input2} + F(U_{input1}, U_{input2}, P)$$

where: $U_{output}$ is the output signal from the mixer $U_{input1}$ is the stabilisation signal appearing at one input to the mixer $U_{input2}$ is the pilot demand signal appearing at the other input to the mixer P is a parameter defining the mixing law and which may be preset or derived from a further channel output of the receiver 36 on one of lines 40, or 44.

The effect of the stabilisation signal may be reduced proportionally, for example:

$$F(U_{input1}, U_{input2}, P) = -\{U_{input1} * (U_{input2}/\max U_{input2})\}$$

where max $U_{input2})\}$ is the value of $U_{input2})\}$ which gives maximum control deflection.

In another example, the function may be defined as follows:

$$F(U_{input1}, U_{input2}, P) = 0 \text{ if } U_{input2} < \max U_{input2}/2$$

$$F(U_{input1}, U_{input2}, P) = (\text{a negative sign}) U_{input1} \text{ if } U_{input2} > \max U_{input2}/2$$

The gain set by the multipliers 60 may be derived from an on board potentiometer 66 via analog to digital convertor 68, or from a signal transmitted over a further channel (not shown).

If the aircraft is inverted, the modifications to the pulse width modulated signals will be in the wrong sense to return it to an inverted level attitude so it flies back the right way up.

The sensor unit may be mounted above or below the aircraft. However the effect of the control unit 19 would need to be reversed according to where the sensor unit is mounted. Supposing the sensor extends the servo pulse width if the sensor unit is mounted above the aircraft in the orientation illustrated in FIG. 1, then it would need to produce a reduction in pulse width if the sensor were mounted below the aircraft inverted compared with FIG. 1. Switches 64 and invertors 62 are provided order to preset the controller to accommodate either orientation of the sensor unit.

The functions of the signal processing means may be conveniently implemented using a programmed microprocessor.

In alternative arrangements, the stabilisation signals may be derived from conventional gyros.

We claim:

1. A radio controlled aircraft having an elevator and an aileron and including a radio receiver for receiving an elevator position demand signal for specifying a required position for the elevator and at least one aileron position demand signal for specifying required positions for the aileron; stabiliser means for generating pitch and roll stabilisation signals having values dependent on differences in the aircraft's attitude from level in pitch and roll, respectively, and being effective only for changing the attitude of the aircraft to level, mixer means for combining the pitch and roll stabilisation signals with the elevator and aileron position demand signals, respectively, control means for controlling the positions of the elevator and the aileron in accordance with respective combined signals, and said mixer means being arranged to combine the pitch and roll stabilisation signals with the elevator and aileron position demand signals in accordance with a function which reduces the effects of the stabilisation pitch and roll signals in said combined signals in dependence on increasing values of elevator and aileron position demand signals, respectively.

2. A radio controlled aircraft as claimed in claim 1 wherein, in accordance with said function, the combined signals comprise the sum of the pitch and roll stabilisation signals with the elevator and aileron position demand signals, respectively, when the elevator and aileron position demands signals are below respective preselected levels, and are equal to the elevator and aileron demand signals, respectively, when these are above said preselected levels.

3. A radio controlled aircraft as claimed in claim 1 wherein the values of the pitch and roll stabilisation signals in said combined signals are reduced in proportion to any increase in the respective elevator and aileron position demand signals from maximum values, when the respective position demand signals are zero, to zero, when the respective position demand signals have predetermined values larger than zero.

4. A radio controlled aircraft as claimed in claim 1, wherein the radio receiver is adapted for receiving a gain setting signal for modifying the values of the pitch and roll stabilisation signals prior to their bring combined with said demand signals.

5. A radio controlled aircraft as claimed in claim 1, including two pairs of directional light sensors, the sensors of each pair being responsive to light input from two different directions on opposite sides of a respective axis to provide respective light level signals indicative of the levels of light sensed, said stabiliser means being responsive to light level signals from each said pair of sensors to provide two light level difference signals.

6. A radio controlled aircraft as claimed in claim 5, wherein the light sensors are photo conductive light sensors connected in series across a reference voltage.

7. A radio controlled aircraft as claimed in claim 6, wherein the light sensors are aligned approximately normal to respective pitch and roll axes.

8. A radio controlled aircraft as claimed in claim 6, wherein the light sensors are aligned in directions approximately bisecting the angles between the pitch and roll axes.

9. A radio controlled aircraft as claimed in claim 8, including means to add the two light level difference signals in order to provide one of the pitch and roll stabilisation signals and to subtract one light level difference signal from the other in order to provide the other of the pitch and roll stabilisation signals.

* * * * *